(12) United States Patent
Hall

(10) Patent No.: US 7,120,388 B2
(45) Date of Patent: Oct. 10, 2006

(54) WIRELESS INTERCOM SYSTEM AND METHOD OF COMMUNICATING USING WIRELESS INTERCOM SYSTEM

(75) Inventor: Ronald W. Hall, South Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 479 days.

(21) Appl. No.: 10/319,955

(22) Filed: Dec. 16, 2002

(65) Prior Publication Data

US 2004/0116071 A1 Jun. 17, 2004

(51) Int. Cl.
*H04H 7/00* (2006.01)

(52) U.S. Cl. .................. 455/3.05; 455/575.2; 455/3.06; 455/426.1

(58) Field of Classification Search ................ 455/568, 455/3.05, 550.1, 306, 455, 575.2, 507, 426.1, 455/253; 381/370, 74, 371; 429/96; 340/7.58; 379/373.01, 448
See application file for complete search history.

(56) References Cited

U.S. PATENT DOCUMENTS

| | | | |
|---|---|---|---|
| 299,288 | A | 5/1884 | Stewart |
| 303,553 | A | 8/1884 | Barnard |
| 1,182,896 | A | 5/1916 | Davison |
| 1,699,127 | A | 1/1929 | Wacker |
| 2,486,267 | A | 10/1949 | Dullinsky |
| 3,031,537 | A | 4/1962 | Rose |
| 3,101,155 | A | 8/1963 | Lehr et al. |
| 3,167,619 | A | 1/1965 | Palmaer |
| 3,306,991 | A | 2/1967 | Wood |
| 3,461,463 | A | 8/1969 | Beguin |
| 3,769,095 | A | 10/1973 | Schmidt |
| 3,906,160 | A | 9/1975 | Nakamura et al. |
| 3,977,907 | A | 8/1976 | Roth et al. |
| 4,027,113 | A | 5/1977 | Matsumoto et al. |

(Continued)

FOREIGN PATENT DOCUMENTS

CH 244196 3/1947

(Continued)

OTHER PUBLICATIONS

"Ultraplex™ Ststem" brochure, Panasonic, 2 pages (believed to have been on sale before Jan. 2001).

(Continued)

*Primary Examiner*—Edward F. Urban
*Assistant Examiner*—Tu X. Nguyen
(74) *Attorney, Agent, or Firm*—Stephen W. Buckingham

(57) ABSTRACT

An intercom system enabling a plurality of users to listen to and at least one user to speak to and listen to a remote user. A base station communicates with the remote user. A plurality of ear pieces is wearable by the plurality of users, each of the plurality of ear pieces being capable of wirelessly communicating with the base station. Each of the plurality of ear pieces is capable of listening to the base station within a first range of the base station. At least one of the plurality of ear pieces being capable of wirelessly speaking to the base station within a second range of the base station. The second range is larger than the first range. Thus, one of the plurality of users wearing at least one of the plurality of ear pieces may listen and talk with the remote user only within the first range of the base station and the remainder of the plurality of users wearing the remaining ear pieces may only listen to the remote user outside of the first range of the base station but inside of the second range of the base station.

45 Claims, 14 Drawing Sheets

U.S. PATENT DOCUMENTS

| | | |
|---|---|---|
| 4,117,203 A | 9/1978 | Sjogren |
| 4,125,681 A | 11/1978 | Sjogren |
| 4,278,852 A | 7/1981 | Gorike |
| 4,323,156 A | 4/1982 | Grueneberg |
| D264,961 S | 6/1982 | Oxenreider |
| 4,409,442 A | 10/1983 | Kamimura |
| 4,431,717 A | 2/1984 | Kikuchi |
| 4,482,745 A | 11/1984 | Maulding |
| 4,484,029 A | 11/1984 | Kenney |
| 4,517,413 A | 5/1985 | Pavitt |
| 4,591,661 A | 5/1986 | Bemedetto et al. |
| 4,741,030 A | 4/1988 | Wilson |
| 4,754,230 A | 6/1988 | Schwartz |
| D298,029 S | 10/1988 | Foster |
| 4,815,143 A | 3/1989 | Derhaag |
| 4,882,745 A | 11/1989 | Silver |
| 4,882,770 A | 11/1989 | Miyahira |
| 4,904,549 A | 2/1990 | Goodwin et al. |
| 4,930,148 A | 5/1990 | Lee |
| 4,977,610 A | 12/1990 | Kutz |
| 5,027,433 A | 6/1991 | Menadier et al. |
| 5,033,094 A | 7/1991 | Hung |
| 5,060,308 A | 10/1991 | Bieback |
| D321,500 S | 11/1991 | Fukada |
| D321,680 S | 11/1991 | Blount et al. |
| 5,113,428 A | 5/1992 | Fitzgerald |
| 5,117,464 A | 5/1992 | Jones et al. |
| 5,117,465 A | 5/1992 | MacDonald |
| 5,121,243 A | 6/1992 | Miyahira |
| 5,185,807 A | 2/1993 | Bergin et al. |
| 5,189,400 A | 2/1993 | Schultz |
| 5,203,017 A | 4/1993 | Brooks |
| 5,212,020 A | 5/1993 | Inobe |
| 5,220,677 A | 6/1993 | Brooks |
| 5,247,380 A | 9/1993 | Lee et al. |
| 5,253,095 A | 10/1993 | Menadier |
| D342,947 S | 1/1994 | Totsuka |
| 5,295,191 A | 3/1994 | Van Vroenhoven |
| 5,305,132 A | 4/1994 | Fasen |
| 5,321,848 A | 6/1994 | Miyahira |
| 5,333,206 A | 7/1994 | Koss |
| 5,347,387 A | 9/1994 | Rice |
| 5,402,497 A | 3/1995 | Nishimoto et al. |
| 5,405,716 A | 4/1995 | Yoshimatsu et al. |
| D358,126 S | 5/1995 | Sakuma et al. |
| D364,417 S | 11/1995 | Winston |
| 5,491,839 A | 2/1996 | Schotz |
| 5,508,123 A | 4/1996 | Fan |
| 5,512,891 A | 4/1996 | Kang |
| 5,530,763 A | 6/1996 | Aebi et al. |
| D371,784 S | 7/1996 | Gertz |
| 5,548,623 A | 8/1996 | Casper et al. |
| 5,590,407 A * | 12/1996 | Ishikawa et al. ............ 455/66.1 |
| 5,590,417 A | 12/1996 | Rydbeck |
| D377,477 S | 1/1997 | Harata et al. |
| 5,608,612 A | 3/1997 | Hokao |
| 5,621,384 A | 4/1997 | Crimmins et al. |
| 5,621,662 A | 4/1997 | Humphries et al. |
| 5,644,630 A | 7/1997 | Durco, Jr. |
| 5,673,036 A | 9/1997 | Gabrielle |
| D387,328 S | 12/1997 | Ueda |
| 5,701,356 A | 12/1997 | Stanford |
| 5,710,979 A | 1/1998 | Tamai |
| D390,187 S | 2/1998 | Urvoy |
| 5,721,775 A | 2/1998 | Leifer |
| D393,624 S | 4/1998 | Shim |
| D394,436 S | 5/1998 | Hall et al. |
| 5,784,471 A | 7/1998 | Bebenroth |
| 5,784,685 A | 7/1998 | Stanford |
| 5,794,127 A | 8/1998 | Lansang |
| 5,798,931 A | 8/1998 | Kaehler |
| D399,819 S | 10/1998 | Iida |
| D400,160 S | 10/1998 | Nagano |
| 5,825,896 A | 10/1998 | Leedom |
| 5,828,300 A | 10/1998 | Addy et al. |
| D400,494 S | 11/1998 | Blasé |
| D400,497 S | 11/1998 | Sabag et al. |
| D400,849 S | 11/1998 | Ikeda et al. |
| D402,955 S | 12/1998 | Smith et al. |
| D403,298 S | 12/1998 | Hall et al. |
| D403,299 S | 12/1998 | Smith et al. |
| 5,869,204 A | 2/1999 | Kottke et al. |
| 5,881,156 A | 3/1999 | Treni |
| D408,351 S | 4/1999 | Shim |
| 5,895,728 A | 4/1999 | Walker et al. |
| D409,559 S | 5/1999 | Shim |
| D409,560 S | 5/1999 | Shim |
| D409,975 S | 5/1999 | Zeller |
| 6,003,015 A | 12/1999 | Kang |
| 6,004,689 A | 12/1999 | Walker et al. |
| D419,131 S | 1/2000 | Andrews et al. |
| 6,041,243 A | 3/2000 | Davidson |
| 6,054,920 A | 4/2000 | Smith et al. |
| D432,982 S | 10/2000 | Miyashita |
| 6,130,953 A | 10/2000 | Wilton et al. |
| 6,148,175 A * | 11/2000 | Freedland ................ 455/3.06 |
| 6,157,908 A | 12/2000 | O'Gwynn |
| 6,175,308 B1 | 1/2001 | Tallman et al. |
| 6,223,032 B1 | 4/2001 | Cuffaro |
| 6,230,214 B1 | 5/2001 | Liukkonen et al. |
| 6,236,732 B1 | 5/2001 | Griffin |
| 6,236,969 B1 | 5/2001 | Ruppert et al. |
| 6,252,510 B1 | 6/2001 | Dungan |
| D448,340 S | 9/2001 | Hall et al. |
| 6,300,871 B1 | 10/2001 | Irwin et al. |
| 6,311,071 B1 | 10/2001 | Voroba et al. |
| 6,323,785 B1 | 11/2001 | Nickell et al. |
| 6,406,811 B1 | 6/2002 | Hall |
| 6,426,697 B1 | 7/2002 | Capowski et al. |
| 6,430,299 B1 | 8/2002 | Hall |
| 6,512,832 B1 | 1/2003 | Braun et al. |
| 6,522,765 B1 | 2/2003 | Towle |
| 6,525,854 B1 | 2/2003 | Takahashi et al. |
| 2002/0076060 A1 | 6/2002 | Hall |
| 2002/0132585 A1* | 9/2002 | Palermo et al. ............... 455/41 |
| 2002/0137466 A1 | 9/2002 | Bamburak et al. |
| 2003/0013503 A1 | 1/2003 | Menard et al. |
| 2003/0072358 A1 | 4/2003 | Gurney |
| 2003/0092453 A1 | 5/2003 | Mills et al. |
| 2003/0134666 A1 | 7/2003 | Fletcher |

FOREIGN PATENT DOCUMENTS

| | | |
|---|---|---|
| DE | 19802659 | 7/1999 |
| DE | 10024041 | 12/2000 |
| DE | 20114127 | 11/2001 |
| EP | 0019838 A1 | 5/1980 |
| EP | 0389174 | 9/1990 |
| EP | 0676819 A2 | 10/1995 |
| EP | 0685894 A1 | 12/1995 |
| JP | 409283103 A | 10/1997 |
| JP | 11252017 | 9/1999 |
| WO | WO 89/06075 | 6/1989 |
| WO | WO 90/09726 | 8/1990 |
| WO | WO 90/11657 | 10/1990 |
| WO | WO 98/47311 | 10/1998 |
| WO | WO 99/60764 | 11/1999 |
| WO | WO 00/07176 | 2/2000 |
| WO | WO 01/78443 | * 10/2001 |
| WO | WO 02/23932 | 3/2002 |

| | | |
|---|---|---|
| WO | WO 03/061147 | 7/2003 |

OTHER PUBLICATIONS

"3M Model C960/C860 Wireless Intercom System" headset programming instructions, 3M Food Services Trade Department, publ. 78-6912-0699-8 Rev. D, 2002.

"3M Headset Intercom Systems Model C860/C960SL/C1025" installation instructions, 3M Commercial Care Division, publ. 78-6912-0672-2 Rev. H, Oct. 2003.

"3M Belt Pack Intercom System Model C860" operating instructions, 3M Food Services Trade Department, publ. 78-6912-0692-0 Rev. A, Nov. 2000.

U.S. Appl. No. 08/837,440, filed Apr. 17, 1997, Hall.

"3M Headset Intercom System Model C960" operating instructions, 351 Food Services Trade Department, publ 78-6912-0671-4 Rev. F. May 1999.

"COM900BP Belt-Pac Communicator: Operating Instructions", HM Electronics, Inc. HME #400434-rev Aug. 30, 2000, pp. 1 and 1-8.

"COM400CC Communicator: Operating Instructions", HM Electronics, Inc. HME #400436-Rev Sep. 13, 2000. pp. 1 and 1-9.

* cited by examiner

WIRELESS INTERCOM SYSTEM AND METHOD OF COMMUNICATING USING WIRELESS INTERCOM SYSTEM

TECHNICAL FIELD

This invention relates to intercom systems and, more particularly, to intercom systems of the type enabling a plurality of users to listen to and at least one user to speak to and listen to a remote user.

BACKGROUND

It is common for retail establishments, particularly restaurants, to facilitate drive-up customers with drive-up lanes and windows to service the customer. A customer will typically drive up to a menu/order board and communicate the customer's wishes from the vehicle to staff, including an order taker, inside the retail establishment. The customer, still in the vehicle, will then proceed to one or more windows in order to pay for the purchase, if required, and pick up the merchandise.

An intercom system typically facilitates communication between the occupant of the vehicle and the staff inside the establishment. In a "fast food" restaurant situation, a post mounted speaker and microphone, located near a menu board, is hard wired to an intercom base station located inside the restaurant. The base station wirelessly communicates with a portable device worn by an order taker. The portable device is typically a transceiver worn as a belt pack and an accompanied wired headset. Alternatively, in some instances, the portable device is self-contained on a wearable headset eliminating the need for a belt pack but resulting in a relatively bulky and unsightly headset. The order taker typically listens continually to the post mounted microphone and presses a button in order to speak to the vehicle occupant as needed.

Often it is desirable to have other restaurant employees listen to the conversation between the order taker and the vehicle occupant. For example, a cook can listen as the order is actually given to the order taker and can start preparation for the order even before the order is officially entered into the restaurant's order system by the order taker. In a typical fast food restaurant, employees beyond the order taker, such as a cook, can listen to the vehicle occupant but such additional employees must wear the same belt pack that the order taker typically wears. The combination belt pack and head set, or the self-contained headset, are not only expensive but are also bulky and obtrusive. This effectively limits how many restaurant employees can wear the device and what activities they can do while wearing the device. Further, the belt pack and headset combination typically suffers from reliability problems due to frequent damage to the connecting wire between the belt pack and headset.

Also it may be desirable for a fast food restaurant to have more than one employee available who can take orders. A belt pack and headset combination could be switched from one employee to another. However, such switching is cumbersome and results in some downtime during switch over limiting the effectiveness of this option. Multiple employees could each wear a separate belt pack and headset combination and each could be ready to take orders. Only the actual order taker would actually press a button activating the speak portion of the transceiver on their belt pack. Again, this option is expensive and the obtrusiveness of the belt pack and headset combination limits the activities of the employee who is not taking orders.

SUMMARY OF THE INVENTION

The intercom system of the present invention provides advantages which are not immediately apparent. The portable device associated with the present invention is smaller in size, is less costly and is less obtrusive, expanding the number of people who can and will wear the portable device. Further, the retail establishment has increased efficiencies due to an expanded number of people who are able to listen to the conservation between the vehicle occupant and the order taker.

The intercom system of the present invention has a different range over which an employee wearing the portable device can be from the base station, or a cradle holding a belt pack, for listening and for talking. While employees wearing the portable device may listen to the conversation over a relatively broad range, employees wearing the portable device may only talk on the intercom system when such employees are positioned a relatively small distance from the base station or cradle.

The dichotomy of range between "talk and listen" and "listen only" allows multiple employees to have the capability to talk. For example, any one of the employees could be an order taker at any given point in time, but only one employee could have the ability to talk, namely the person physically located close to base station or cradle. Anyone else who is not close enough to the base station or cradle would not have the ability to talk. This effectively prevents anyone but the order taker from talking to the vehicle occupant regardless of the switch position of an employee's transceiver and regardless of whether or not the transmit button has been pushed, even accidentally. Prevention of inadvertent speech is a significant safeguard. Employees not intending to be speakers and who are not expecting their speech to be heard by the vehicle occupant can be assured that it won't be heard. Thus, a cook who listens to an order may verbally communicate with his/her assistants without fear that the comments will be heard by the vehicle occupant regardless of the switch settings on his/her portable device. Yet each employee who wears the portable device still has the capability of talking to the vehicle occupant by simply to going near the location of a base station or cradle.

If more than one person is at the order taker's location, i.e., next to the base station or cradle, then only the person or persons whose portable device has been placed in transmit mode will transmit to and talk to the vehicle occupant. Thus, all existing precautions and safeguards are still present. In addition, the additional safeguard of proximity is also present.

The present invention also provides "hands free" talking ability, if desired. The order taker does not need to push a button to talk to the vehicle occupant. Rather, the order taker can leave his/her portable unit in transmit mode as he or she moves around the restaurant. The order taker won't actually be able to speak to the vehicle occupant, however, until the order taker moves to the proximity of the base station or cradle. The order taker can simply walk up and speak. The act of moving to within the proximity of the base station or cradle effectively enables speech to the vehicle occupant. Similarly, the order taker knows that walking away from the base station or cradle effectively disables his/her ability to speak to the vehicle occupant.

In one embodiment, the present invention provides an intercom system enabling a plurality of users to listen to and at least one user to speak to and listen to a remote user. A base station communicates with the remote user. A plurality of ear pieces is wearable by the plurality of users, each of the plurality of ear pieces being capable of wirelessly communicating with the base station. Each of the plurality of ear pieces is capable of listening to the base station within a first range of the base station. At least one of the plurality of ear pieces is capable of wirelessly speaking to the base station within a second range of the base station. The second range is larger than the first range. Thus, one of the plurality of users wearing at least one of the plurality of ear pieces may listen and talk with the remote user only within the first range of the base station and the remainder of the plurality of users wearing the remaining ear pieces may only listen to the remote user outside of the first range of the base station but inside of the second range of the base station.

In another embodiment, the present invention provides an intercom system enabling a first user to communicate with a second user. A base station communicates with the remote user. An ear piece is wearable by the first user, the ear piece being capable of wirelessly communicating with the base station. The ear piece is capable of listening to the base station within a first range of the base station. The ear piece being capable of wirelessly speaking to the base station within a second range of the base station. The second range is larger than the first range. Thus, the first user wearing the ear piece may listen and talk with the remote user only within the first range of the base station and may only listen to the remote user outside of the first range of the base station but inside of the second range of the base station.

In another embodiment, the present invention provides an intercom system enabling a plurality of users to listen to and at least one user to speak to and listen to a remote user. A base station communicates with the remote user. A portable communication device wirelessly communicates with the base station on a first frequency. A cradle is adapted to host the portable communication device and is operatively coupled to the portable communication device when hosting the portable communication device. A plurality of ear pieces are wearable by the plurality of users, each of the plurality of ear pieces being capable of wirelessly communicating with the portable communication device through the cradle on a second frequency. The plurality of ear pieces are capable of listening to the portable communication device through the cradle within a first range of the portable communication device. At least one of the plurality of ear pieces is capable of wirelessly speaking to the portable communication device through the cradle within a second range of the portable communication device. The second range is larger than the first range. Thus, one of the plurality of users wearing the at least one of the plurality of ear pieces may listen and talk with the remote user only within the first range of the base station and a remainder of the plurality of users wearing a remainder of the plurality of ear pieces may only listen to the remote user outside of the first range of the base station but inside of the second range of the base station.

In another embodiment, the present invention provides an intercom system enabling a first user to communicate with a remote user. A base station communicates with the remote user. A portable communication device wirelessly communicates with the base station on a first frequency. A cradle is adapted to host the portable communication device and is operatively coupled to the portable communication device when hosting the portable communication device. An ear piece is wearable by the first user, the ear piece being capable of wirelessly communicating with the portable communication device through the cradle on a second frequency. The ear piece is capable of listening to the portable communication device through the cradle within a first range of the portable communication device. The ear piece is capable of wirelessly speaking to the portable communication device through the cradle within a second range of the portable communication device. The second range is larger than the first range. Thus, the first user wearing the ear piece may listen and talk with the remote user only within the first range of the base station and may only listen to the remote user outside of the first range of the base station but inside of the second range of the base station.

In another embodiment, the present invention is useful in an intercom system enabling a first user to communicate with a remote user, having a base station for communicating with the remote user and a belt pack for wirelessly communicating with the base station on a first frequency. A cradle is adapted to host the belt pack and is operatively coupled to the belt pack when hosting the belt pack. An ear piece is wearable by the first user, the ear piece being capable of wirelessly communicating with the belt pack through the cradle on a second frequency. The ear piece is capable of listening to the belt pack through the cradle within a first range of the belt pack. The ear piece is capable of wirelessly speaking to the belt pack through the cradle within a second range of the belt pack. The second range is larger than the first range. Thus, the first user wearing the ear piece may listen and talk with the remote user only within the first range of the base station and may only listen to the remote user outside of the first range of the base station but inside of the second range of the base station.

In another embodiment, the present invention is useful in an intercom system enabling a first user to communicate with a remote user, having a base station for communicating with the remote user and a plurality of belt packs for wirelessly communicating with the base station on a first frequency. A cradle is adapted to host one of the plurality of belt packs and is operatively coupled to the one of the plurality of belt packs when hosting the one of the plurality of belt packs. An ear piece, wearable by the first user, is capable of wirelessly communicating with the one of the plurality of belt packs through the cradle on a second frequency. The ear piece is capable of listening to the one of the plurality of belt packs through the cradle within a first range of the one of the plurality of belt packs. The ear piece is capable of wirelessly speaking to the one of the plurality of belt packs through the cradle within a second range of the one of the plurality of belt packs. The second range is larger than the first range. Thus, the first user wearing the ear piece may listen and talk with the remote user only within the first range of the base station and may only listen to the remote user outside of the first range of the base station but inside of the second range of the base station.

In a preferred embodiment, the second range is an order of magnitude greater than the first range.

In a preferred embodiment, the second range is twenty-five times greater than the first range.

In a preferred embodiment, the first range is not more than two meters.

In a preferred embodiment, the second range is on the order of fifty meters.

In a preferred embodiment, at least one of the ear pieces is switchable between listen only and listen and talk modes.

In a preferred embodiment, the invention further comprises a remotely located speaker and microphone operatively coupled to the base station for communicating with the remote user.

In a preferred embodiment, the portable communication device is a belt pack wearable by one of the plurality of users.

In another embodiment, the present invention provides a method of communicating using an intercom system enabling a plurality of users to listen to and at least one user to speak to and listen to a remote user, a base station for communicating with the remote user; and a plurality of ear pieces wearable by the plurality of users, each of the plurality of ear pieces being capable of wirelessly communicating with the base station, each of the plurality of ear pieces being capable of listening to the base station within a first range of the base station, at least one of the plurality of ear pieces being capable of wirelessly speaking to the base station within a second range of the base station, and the second range being larger than the first range. The plurality of users who are within the second range of the base station but who are not within the first range of the base station are allowed to listen to the remote user through the base station. Moving at least one user to within the first range of the base station enables both listening to and talking to the remote user.

In another embodiment, the present invention provides a method of communicating using an intercom enabling a first user to communicate with a remote user, a base station for communicating with the remote user, a belt pack for wirelessly communicating with the base station on a first frequency; a cradle adapted to host the belt pack and being operatively coupled to the belt pack when hosting the belt pack; and an ear piece wearable by the first user, the ear piece being capable of wirelessly communicating with the belt pack through the cradle on a second frequency, the ear piece being capable of listening to the belt pack through the cradle within a first range of the belt pack, the ear piece being capable of wirelessly speaking to the belt pack through the cradle within a second range of the belt pack, the second range being larger than the first range. The belt pack is hosted in the cradle. The plurality of users who are within the second range of the base station but who are not within the first range of the base station are allowed to listen to the remote user through the base station. Moving at least one user moving to within the first range of the base station enables both listening to and talking to the remote user.

In a preferred embodiment, the second range is an order of magnitude greater than the first range.

In a preferred embodiment, the first range is not more than two meters.

In another embodiment, the present invention provides, an intercom system having a base station, an ear piece wearable by a user, the ear piece being capable of wirelessly communicating with the base station, wherein the ear piece is switchable between listen only and listen and talk modes.

In another embodiment, the present invention provides a device for allowing a user to communicate with a base station. An ear piece is adaptable to be attachable to an ear of the user, the ear piece being capable of wireless communication with the base station. A tether is attached to the ear piece and is adapted to be attached to an article of clothing being worn by the user.

DETAILED DESCRIPTION

Figure 1:
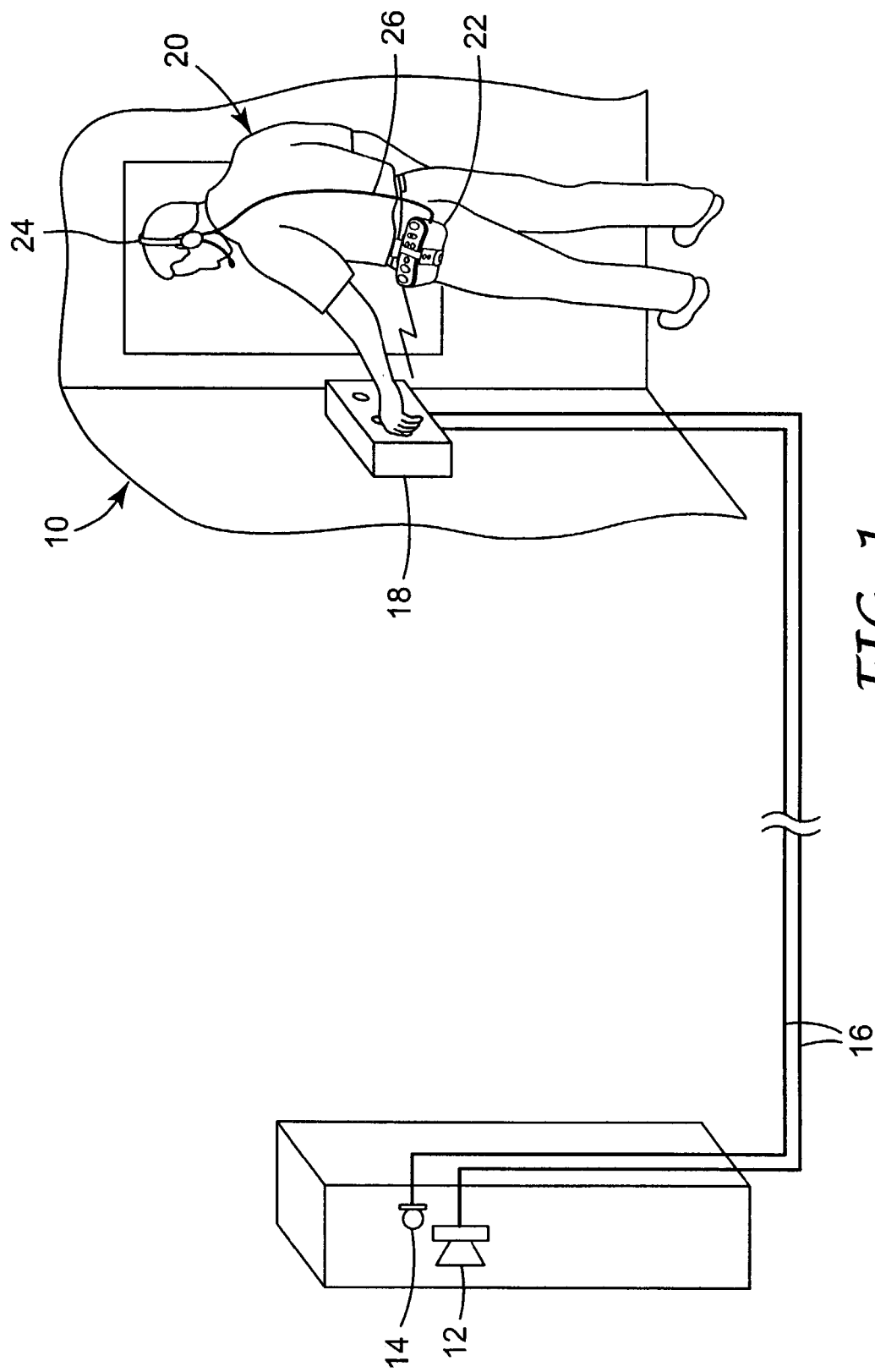
FIG. 1 illustrates a prior art intercom system utilizable in a drive up retail establishment.

FIG. 1 illustrates a prior art intercom system useful in a retail establishment 10 having a drive up facility, such as a restaurant, and particularly useful in a fast food restaurant having a drive up facility. Speaker 12 and microphone 14 are post mounted near a menu board (not shown) adjacent the drive up lane at establishment 10. Speaker 12 and microphone 14 are connected via cable 16 to base station 18 in the interior of establishment 10. An order taker 20 is able to communicate wirelessly to base station 18 and via cable 16 to speaker 12 and microphone 14 and, ultimately, a customer present in a vehicle in the drive up lane near the post mounted speaker 12 and microphone 14. Typically, order taker 20 wears a belt pack 22 coupled to an associated headset 24 by wire 26. Head set 24 contains an ear piece or ear pieces for listening and a microphone for talking. Belt pack 22 contains electronics enabling wireless communication to base station 18. Belt pack 22 commonly includes at least one button which order taker 20 may press to enable belt pack 22 to transmit to base station 18 and, via wire 16, to the customer located near the drive up post. Otherwise, belt pack 22 is commonly in "listen only" mode enabling order taker 20 to listen to the customer but not to talk to the customer.

Figure 2:
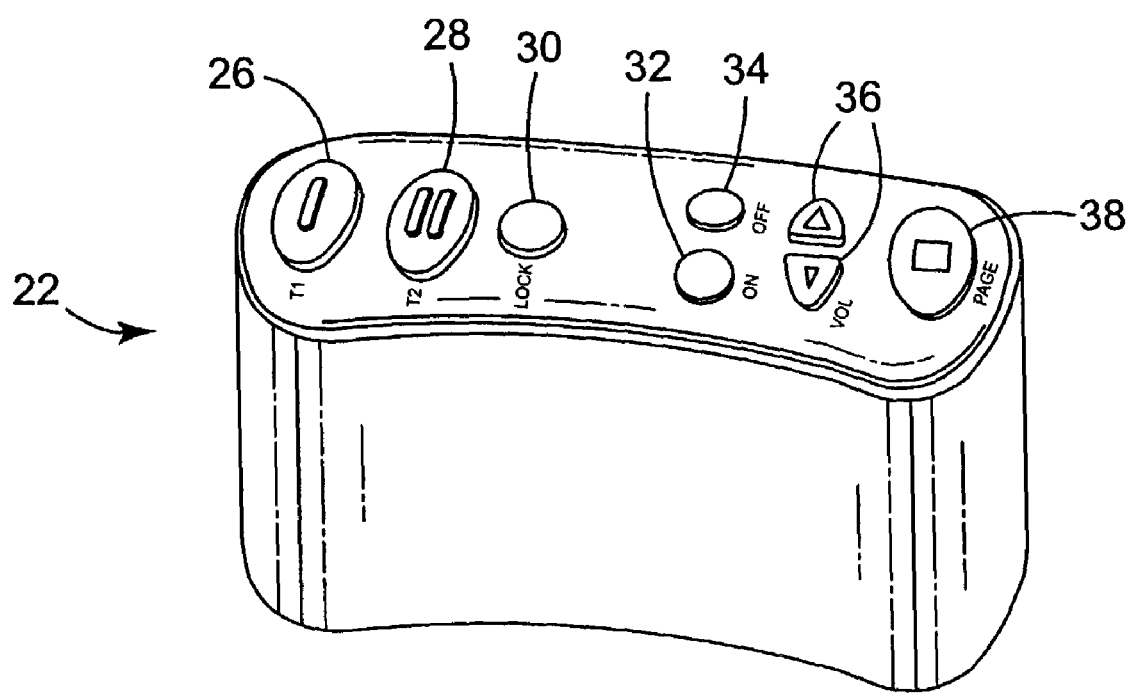
FIG. 2 illustrates a prior art belt pack for use in the prior art intercom system of FIG. 1.

A prior art belt pack 22 is illustrated in FIG. 2. Belt pack 22 contains communication components enabling belt pack 22 to wirelessly communicate with base station 18. It is physically formed for ease in wearing at the waist of order taker 20 and in attachment to clothing of order taker 20, for example, by attachment to the belt of order taker 20.

Buttons on the top of belt pack 22 enable order taker 20 to control the functioning of belt pack 22. Button 26 (T1) and button 28 (T2) enable belt pack 22 to wirelessly communicate with base station 18 on either of two different frequencies. This enables a single belt pack 22 to communicate on either of two separate intercom systems. Only one of the two frequencies is utilized in a single intercom system. Button 30 (Lock) enables order taker 20 to put belt pack 22 in a continuous transmit mode. When button 30 is engaged, belt pack 22 transmits continuously to base station 18 enabling order taker 20 to talk to the drive up customer without using a hand to otherwise push a button. However, this continuous talk mode also enables the drive up customer to hear everything that order taker 20 says whether or not order taker 20 intends the drive up customer to hear.

Button 32 (On) and button 34 (Off) are self explanatory. Volume buttons 36 enable order taker 20 to increase or decrease the volume of sound occurring at ear pieces of head set 24 and the volume of order taker 20's voice through the microphone contained in head set 24.

In use, order taker 20 hooks belt pack 22 to his/her belt, places head set 24 on his/her head and connects wire 26 between belt pack 22 and head set 24. Order taker 20 turns belt pack 22 ON (button 32) and listens to any drive up customer appearing near microphone 14. Order taker 20 may also walk over to base station 18 and press a button on base station 18 to enable order taker 20 to talk to the drive up customer. And, alternatively, order taker 20 may use lock button 30 to enable "hands free" talking to the drive up customer. Page button 38, when pressed, enables order taker 20 to speak with other similarly equipped employees without allowing the drive up customer to hear the conversation.

Figure 3:
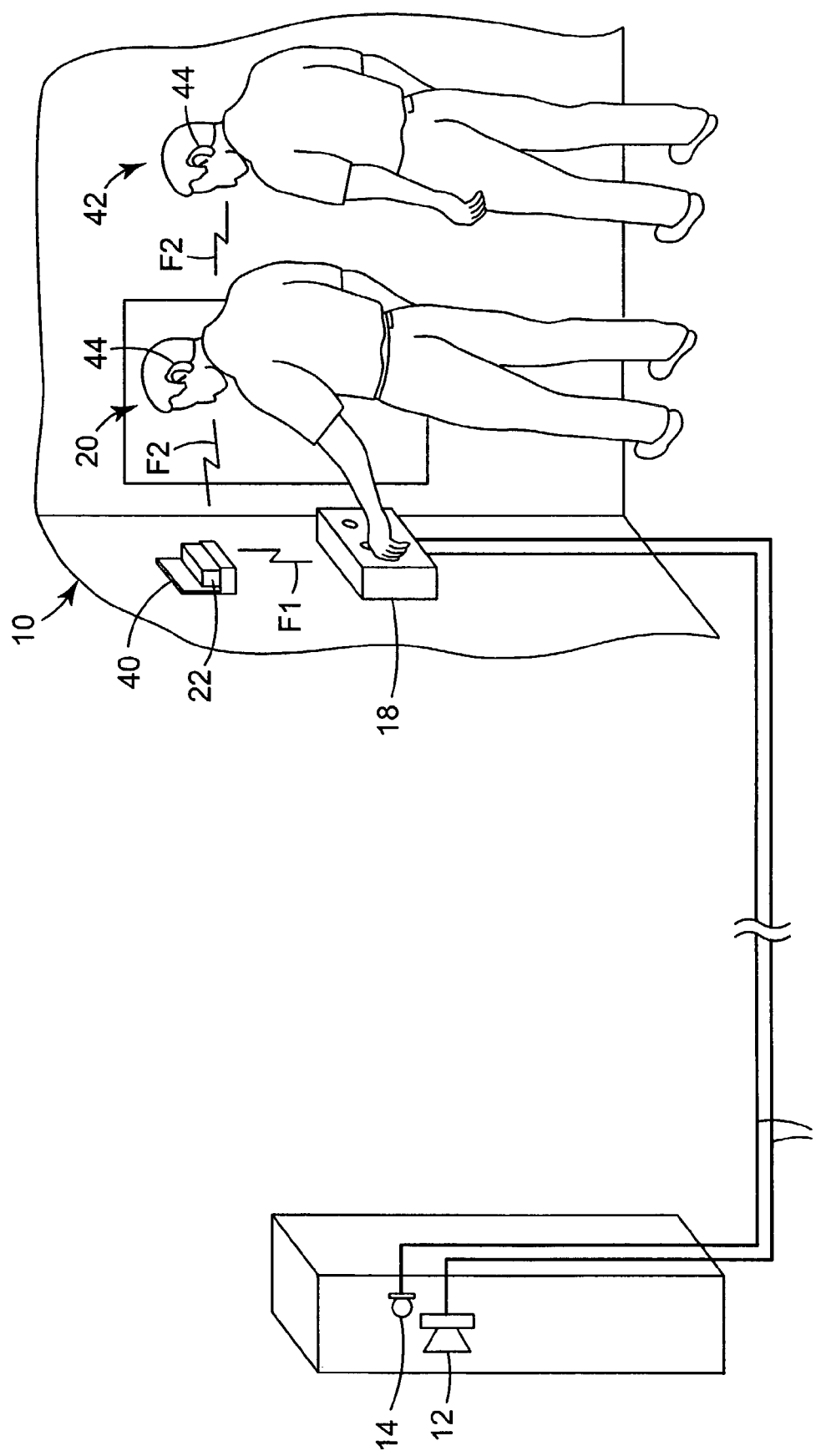
FIG. 3 illustrates an embodiment of an intercom system of the present invention.

FIG. 3 illustrates an embodiment of an intercom system of the present invention. As in the prior art system illustrated in FIG. 1, post mounted speaker 12 and microphone 14 are connected via a cable 16 to a base station 18 located inside retail establishment 10, such as a restaurant. However, in the intercom system illustrated in FIG. 3, belt pack 22, instead of being worn by order taker 20, is now held in a relatively fixed location by cradle 40. Belt pack 22 still wirelessly communicates directly with base station 18 on a frequency F1. While cradle 40 and belt pack 22 are illustrated in FIG. 3 as being located in close proximity to base station 18, it is contemplated that cradle 40 and belt pack 22 may be located anywhere within or around retail establishment 10 so long as belt pack 22 remains in wireless range of base station 18. Alternatively, belt pack 22 may be hardwired to base station 18 instead of relying on the existing wireless communication between belt pack 22 and base station 18.

Belt pack 22 is operatively coupled to electronics contained in cradle enabling wireless communication with one or more ear sets 44 which can be worn by employees or other occupants of retail establishment 10. Wireless communication between cradle 40 and ear sets 44 occur at a frequency F2, different from wireless frequency F1 established for communication between belt pack 22 and base station 18. Note that wireless communication frequency F2 is not analogous to the second frequency selectable by pushing T2 button 28 on prior art belt pack 22. As noted above, pushing T2 button 28 on belt pack 22 allows belt pack 22 to wirelessly communicate with base station 18 on a second frequency. It does not allow belt pack 22 to wirelessly communicate with an ear set 44.

Order taker 20 and another employee 42 of retail establishment 10 each wear an ear set 44 worn on the head in a manner similar to conventional hear aids. Each ear set 44 communicates wirelessly on frequency F2 with cradle 40.

Since cradle 40 is directly coupled, preferably via wire, to belt pack 22, since belt pack 22 can communicate with base station 18, and since base station 18 can communicate with speaker 12 and microphone 14, ear set 44 can communicate with the occupant of a vehicle located in the drive up lane in the proximity of speaker 12 and microphone 14.

The new intercom system operates with a plurality of ear sets 44 from a single base station 18. Ear sets 44 communicate wirelessly on frequency F2 to the fixed location of cradle 40. A relatively high power transmitter in cradle 40 allows ear sets 44 located throughout a relatively wide area of retail establishment 10 to listen to the conversation with the drive up customer. Typically, the listen range for ear sets 44 can be in the approximately fifty (50) meters range or can be in the six (6) to nine (9) meters range. Preferably, a 0.5 milliwatts transmitter is utilized in cradle 40. However, a relatively low power transmitter, preferably 0.05 milliwatts, in ear sets 44 allows ear sets 44 to talk with the drive up customer only when the wearer of ear set 44 is within talking range of cradle 40, less than the listen range and, preferably, approximately two meters.

This intercom system enables all wearers of ear sets 44 to listen to the conversation between order taker 20 and a person, for example, ordering from a vehicle located near the remote post holding speaker 12 and microphone 14. However, only the person, typically order taker 20, wearing ear set 44 is enabled to talk to the person ordering. This forced range dichotomy between listening and talking ensures that only one person can talk to the person ordering (assuming only the order taker is physically located in retail establishment 10 at an ordering location). This also enables order taker 20 to talk with the person in the vehicle ordering without hands (hands free) or not by simply moving closer to or farther away, respectively, from the fixed cradle 40 location, typically the ordering station. Order taker 20 can not talk to the person in the vehicle ordering without being in near proximity to the ordering station, for example, but may easily "switch" to talk mode, without using hands, by moving in close proximity to the ordering station (cradle 40). Further, this forced dichotomy in range eliminates potential confusion from more than one person talking with the person in the ordering vehicle and eliminates the danger of the person in the ordering vehicle from hearing an inappropriate comment from a restaurant employee who does not realize that their microphone is live.

However, in a preferred embodiment, to reduce power consumption and prevent any possibility of a person wearing ear set 44 from being accidentally overheard by the person in the ordering vehicle, ear set 44 contains a three position switch, namely OFF, RECEIVE ONLY and TRANSMIT/RECEIVE. Only in the TRANSMIT/RECEIVE mode would ear set 44 be able to talk to cradle 40 and, hence, to the person in the ordering vehicle. In RECEIVE ONLY mode, power to transmitter portion of transceiver in ear set 44 is disabled.

The operating range of "talk mode" of F2 wireless communication frequency may be extended by electrically coupling the F2 signal to the retail establishment's electrical wiring which then serves as a large antenna. Further, several belt pack 22 and cradle 40 combinations may be located in a building to increase coverage. In this case, one or more of belt packs 22 would communicate with base station 18.

Figure 4:
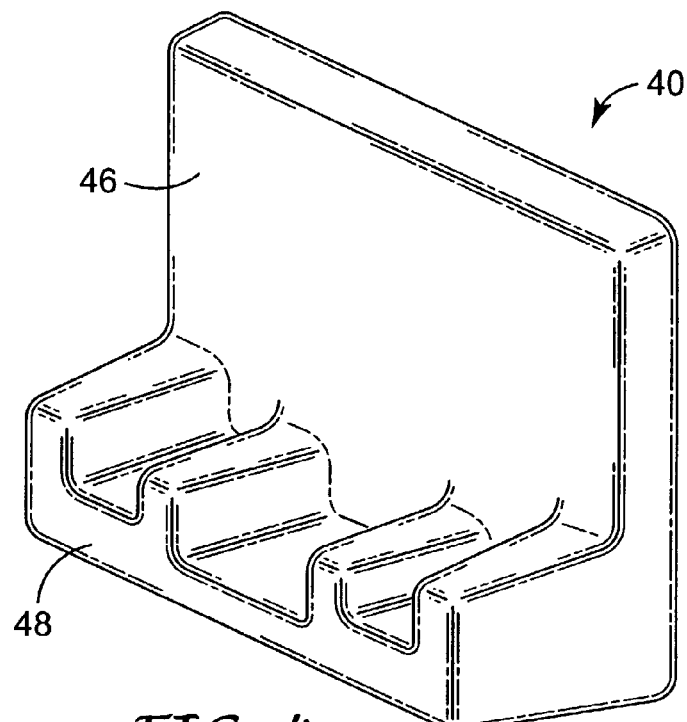
FIG. 4 illustrates a cradle for holding a belt pack in an embodiment of intercom system of the present invention.
Figure 5:
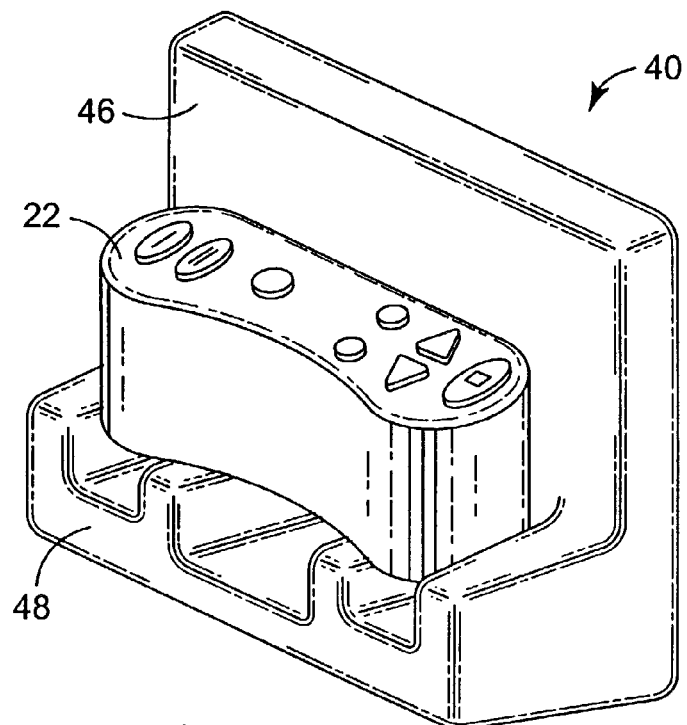
FIG. 5 illustrates a belt pack being held in a cradle of FIG. 4 for use in an embodiment of an intercom system of the present invention.

FIG. 4 is an illustration of cradle 40 having a back plane 46 and a lower lip 48. Back plane 46 allows cradle 40 to be easily mounted to a wall. Lower lip 48 allows belt pack 22 to be placed into and secured by cradle 40. As noted above, cradle 40 contains electronics allowing cradle 40 to wirelessly communicate with ear set 44. Preferably, the physical connection between belt pack 22 and cradle 40 is a modular telephone connector. FIG. 5 is an illustration of cradle 40 holding belt pack 22.

Figure 6:
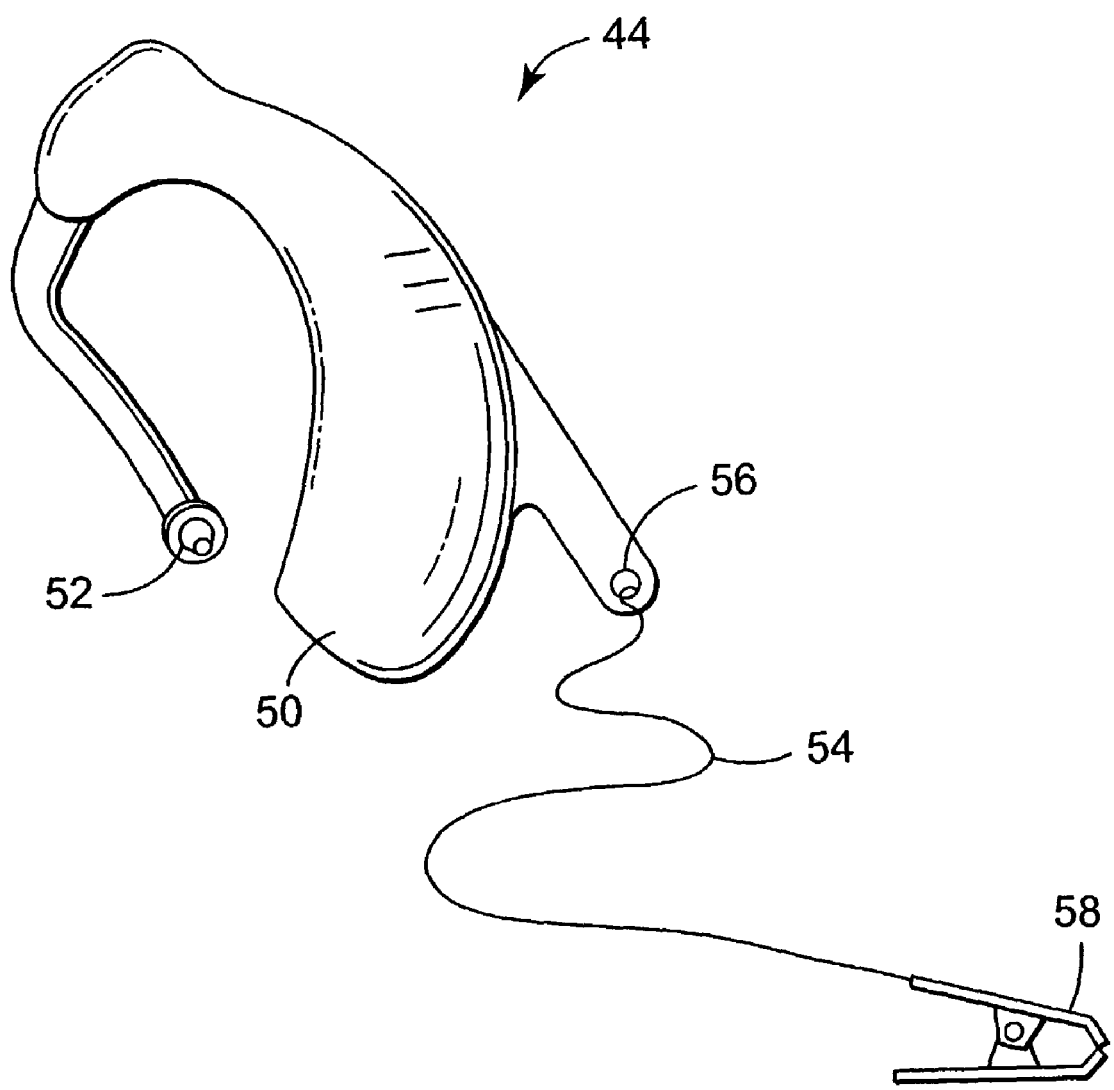
FIG. 6 illustrates an ear set for use in an embodiment of an intercom system of the present invention.

FIG. 6 is a close-up view of ear set 44 having a main body 50 acoustically coupled to an ear piece 52. Tether 54 is secured to ear set 44 through hole 56. Clip 58, at one end of tether 56, helps to secure ear set 44 to the wearer. This is important to help prevent ear set 44 from inadvertently falling into a piece of equipment, such as a French fry fryer, or falling onto the floor and being destroyed.

Figure 7:
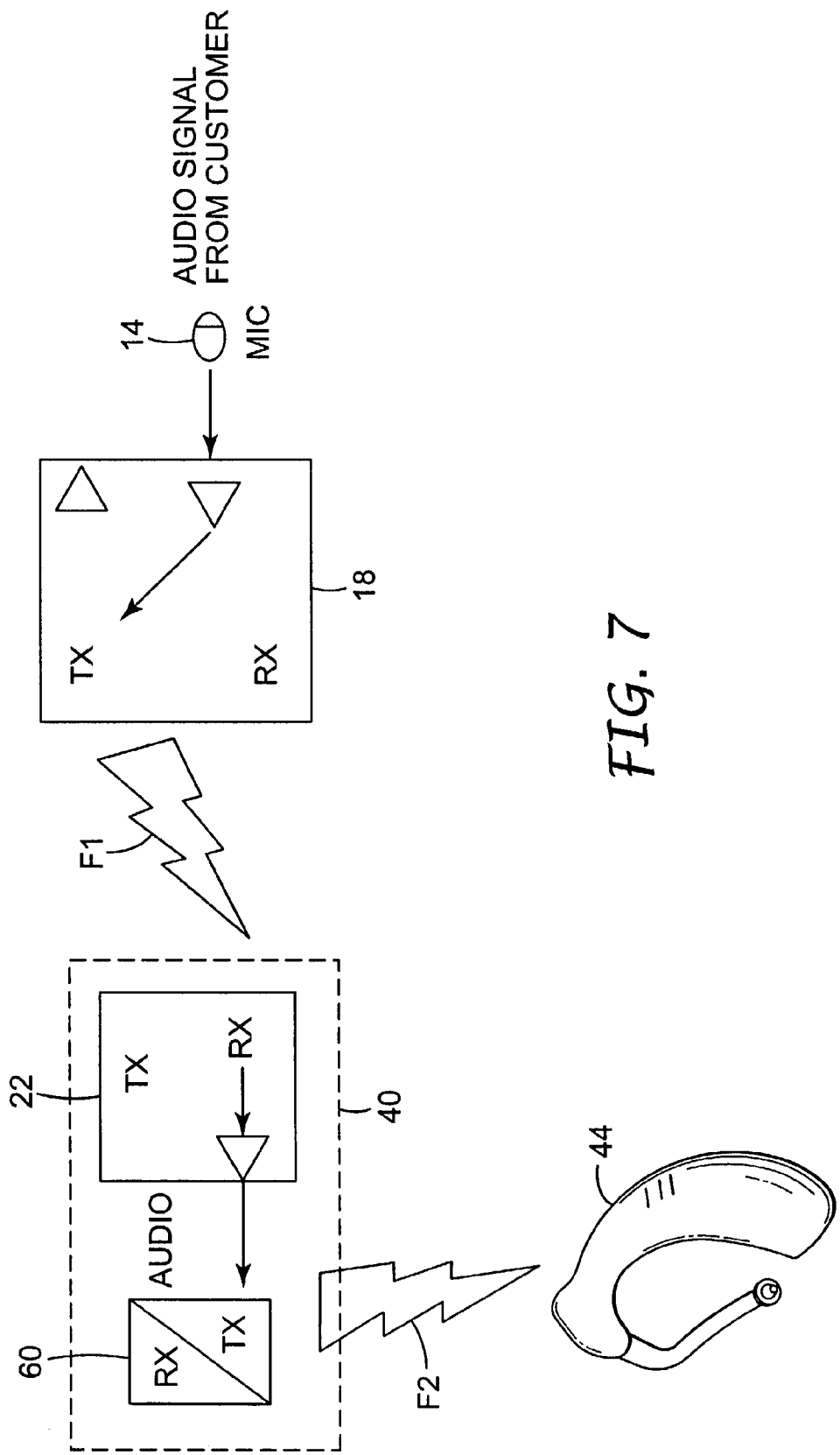
FIG. 7 is a diagrammatic illustration of the system signal path of listen mode in an embodiment of an intercom system of the present invention.

FIG. 7 is a diagrammatic illustration of the signal path of an embodiment of the intercom system of the present invention in "listen" mode, i.e., when ear set 44 wearers are listening to the person in the ordering vehicle. In listen mode, microphone 14 picks up the voice of the person ordering. This audio signal is sent via cable 16 (FIG. 3) to base station 18. A radio frequency signal is then transmitted via wireless frequency F1 to belt pack 22 being held in cradle 40. The transmitter/receiver in belt pack 22 is in receive mode. Belt pack 22 plugs into cradle 40 and the radio frequency signal is sent wirelessly at frequency F2 via secondary transceiver 60, set in transmit mode, to ear set 44.

Figure 8:
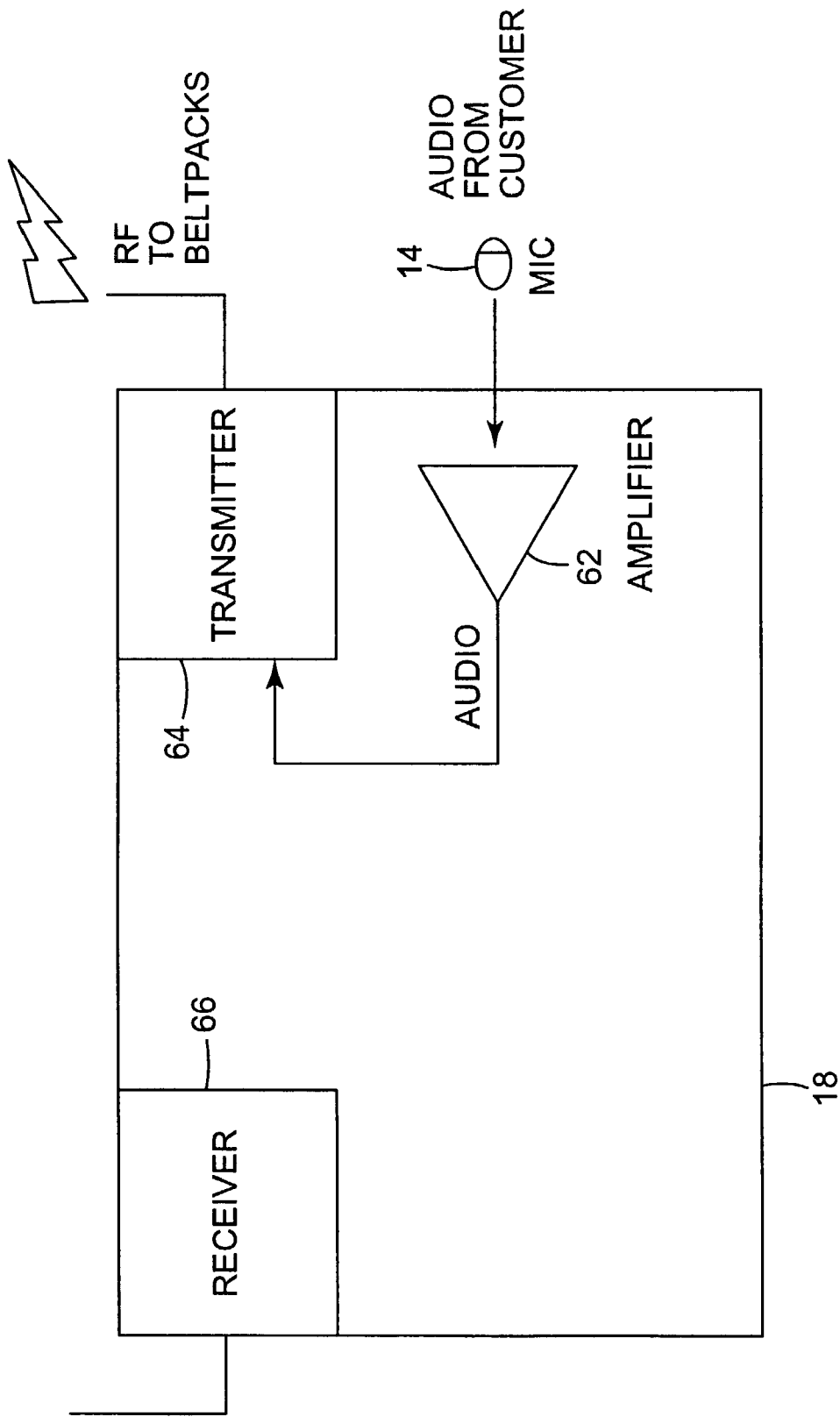
FIG. 8 is a diagrammatic illustration of the signal path in a base station in listen mode in an embodiment of an intercom system of the present invention.

FIG. 8 is a block diagram of base station 18 showing the signal path in listen mode in more detail. Again, the audio signal is obtained from microphone 14 and amplified by amplifier 62 and sent to transmitter 64 for conversion to radio frequency. Note that receiver 66 of base station 18 is not utilized in listen mode.

Figure 9:
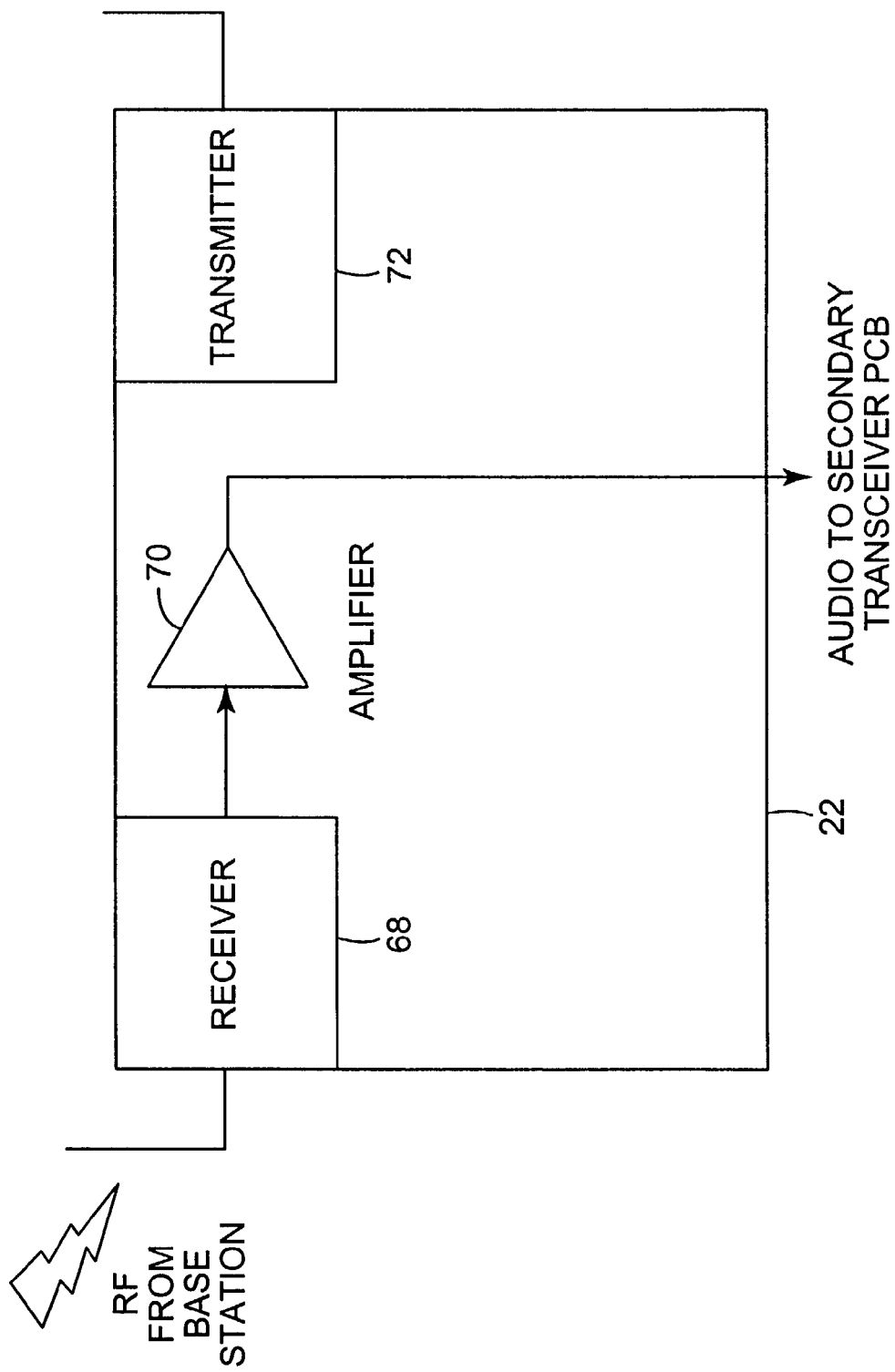
FIG. 9 is a diagrammatic illustration of the signal path in a belt pack in listen mode in an embodiment of an intercom system of the present invention.

FIG. 9 is a block diagram of belt pack 22 showing the signal path in listen mode in more detail. The radio frequency signal is received by receiver 68, converted to an audio signal, amplified by amplifier 70 and sent to a modular telephone connector for direct connection to cradle 40. Note that transmitter 72 of belt pack 22 is not utilized in listen mode.

Figure 10:
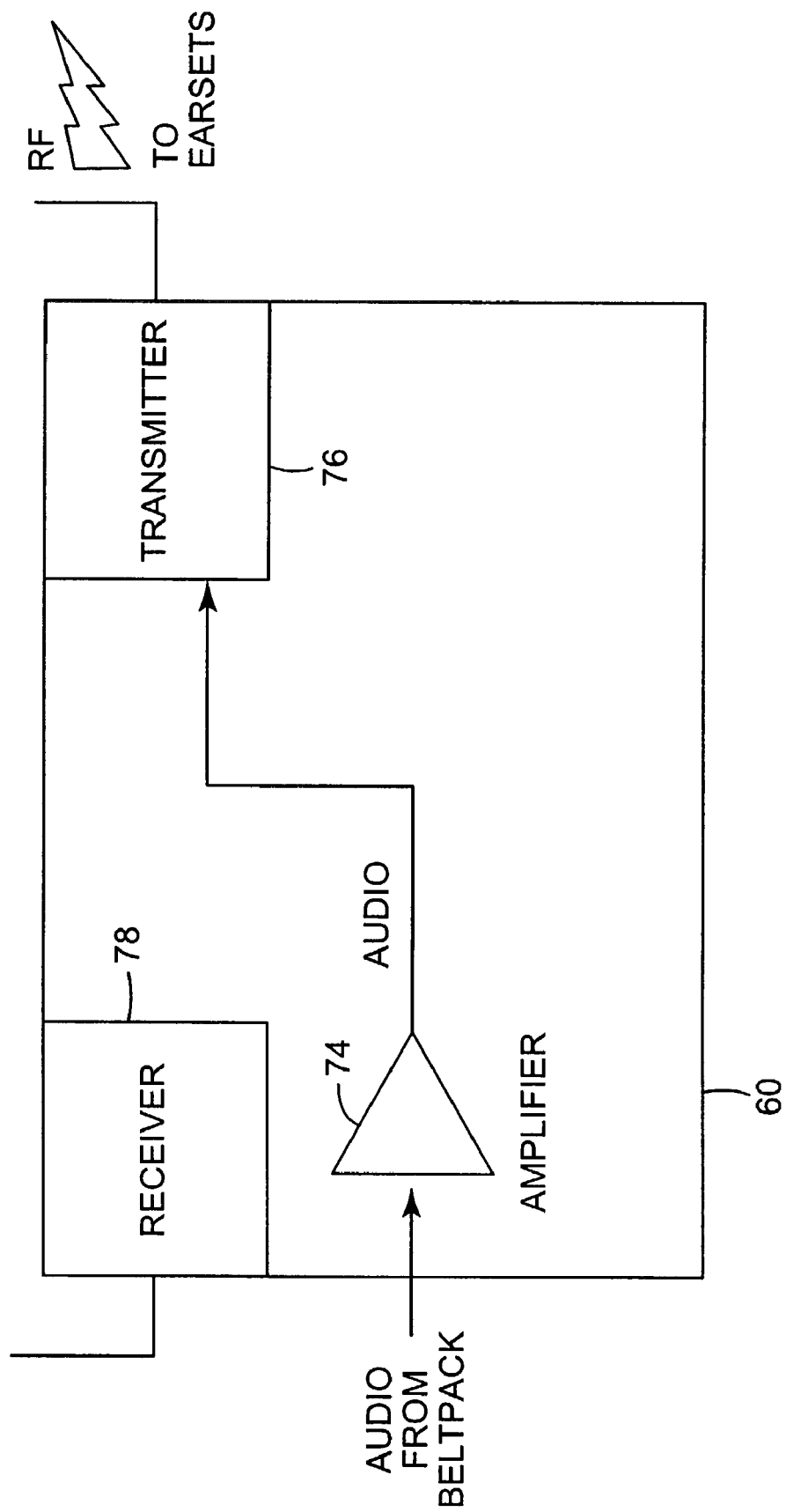
FIG. 10 is a diagrammatic illustration of the signal path in a secondary transceiver in listen mode in an embodiment of an intercom system of the present invention.

FIG. 10 is a block diagram of secondary transceiver 60 of cradle 40 showing the signal path in listen mode in more detail. The audio signal is obtained, via a modular telephone connector, from belt pack 22 (FIG. 9) and is amplified in amplifier 74 and converted to radio frequency and sent via frequency F2 via transmitter 76 to ear set 44. Note that receiver 78 of secondary transceiver 60 is not utilized in listen mode.

Figure 11:
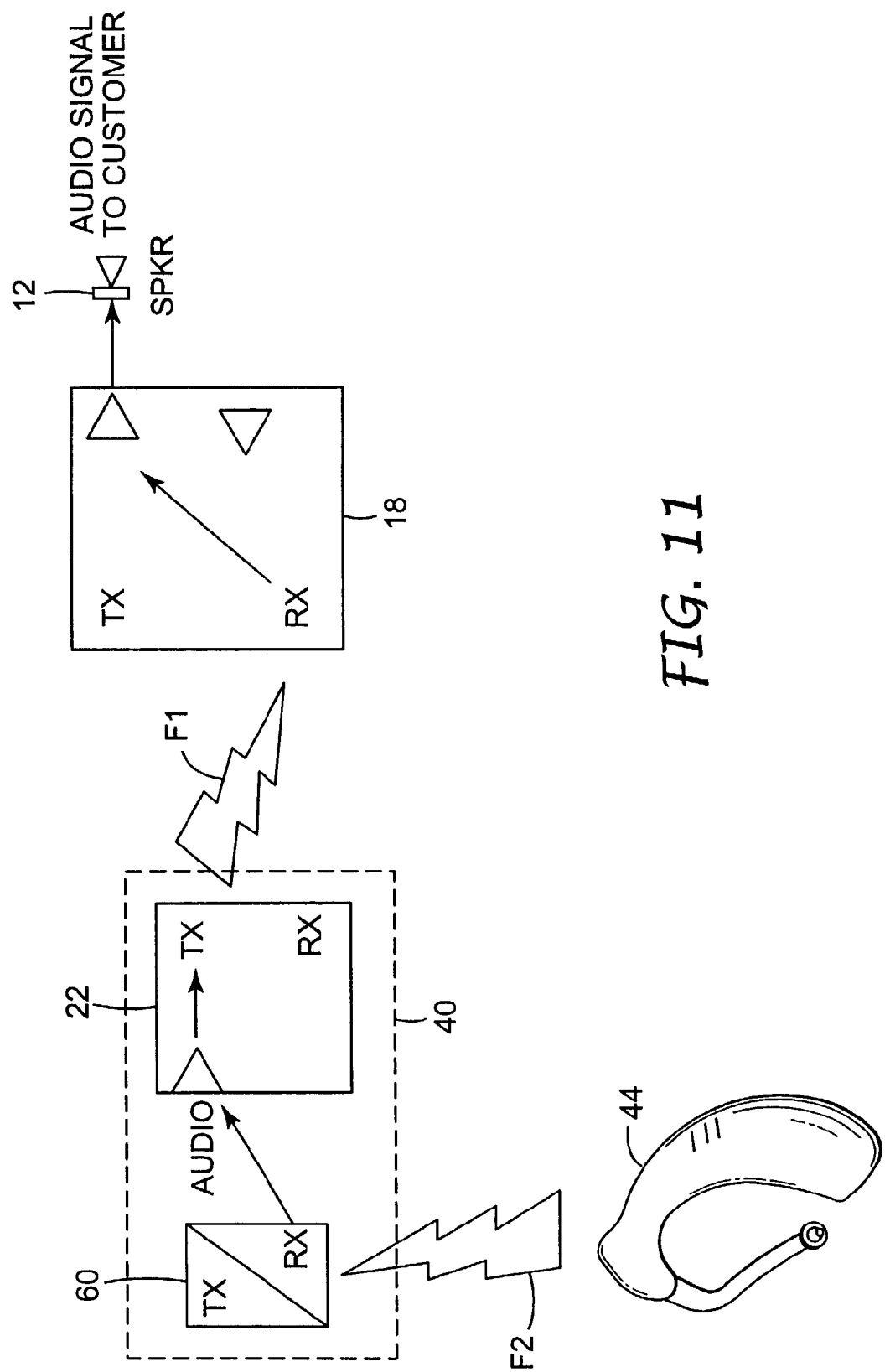
FIG. 11 is a diagrammatic illustration of the system signal path of talk mode in an embodiment of an intercom system of the present invention.

FIG. 11 is a diagrammatic illustration of the signal path of an embodiment of the intercom system of the present invention in "talk" mode, i.e., when an ear set 44 wearer is talking to the person in the ordering vehicle. In talk mode, ear set 44 picks up the voice of ear set 44 wearer and wirelessly transmits at frequency F2 to secondary transceiver 60 in cradle 40. Transceiver 60 in cradle 40 receives the radio frequency signal from ear set 44 and sends an audio signal to belt pack 22, plugged into cradle 40. The transmitter/receiver in belt pack 22 is in talk mode. The signal is then transmitted via wireless frequency F1 to base station 18. Base station 18 receives the radio frequency signal and sends an audio signal via cable 16 (FIG. 3) to speaker 12, remotely located near a menu board.

Figure 12:
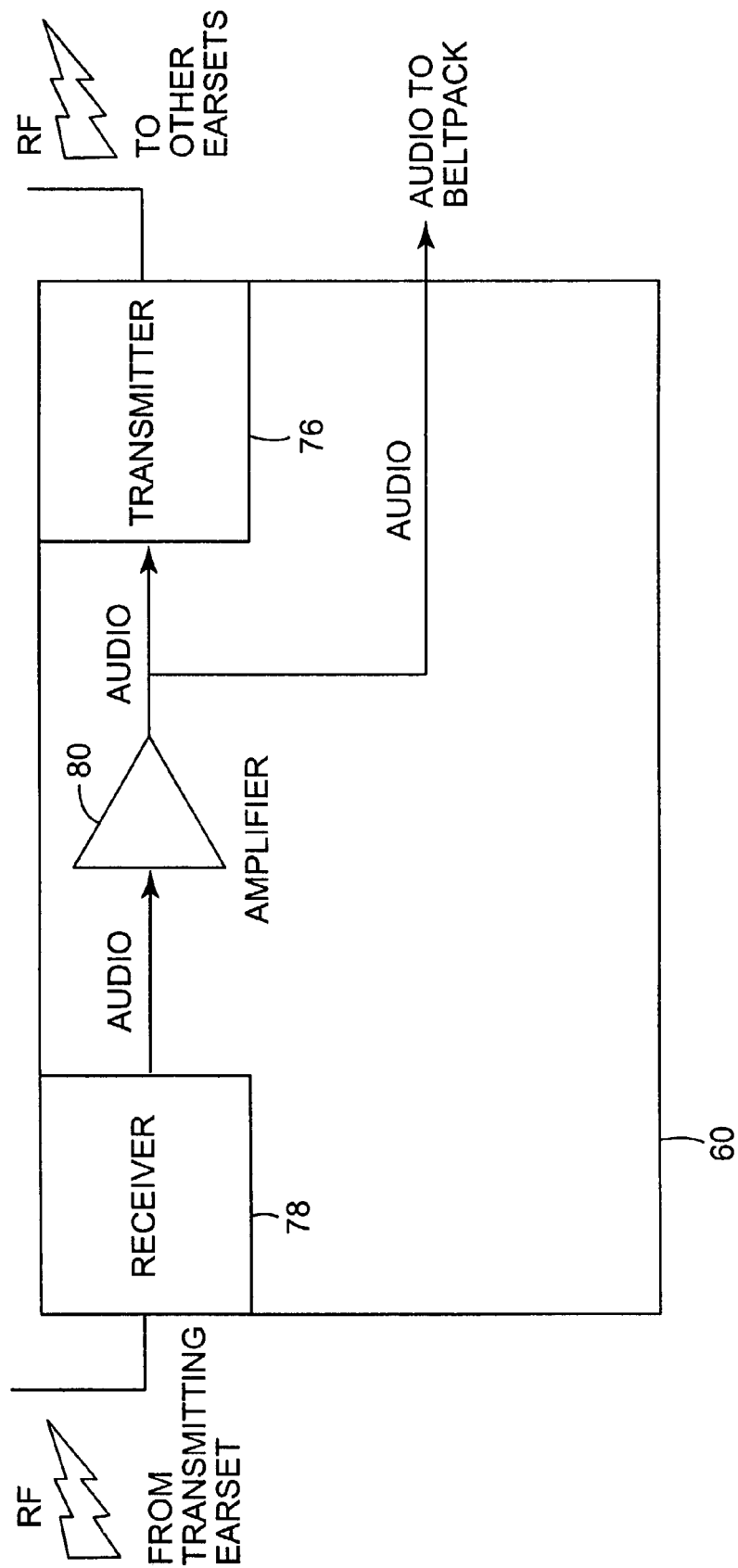
FIG. 12 is a diagrammatic illustration of the signal path in a secondary transceiver in talk mode in an embodiment of an intercom system of the present invention.
Figure 13:
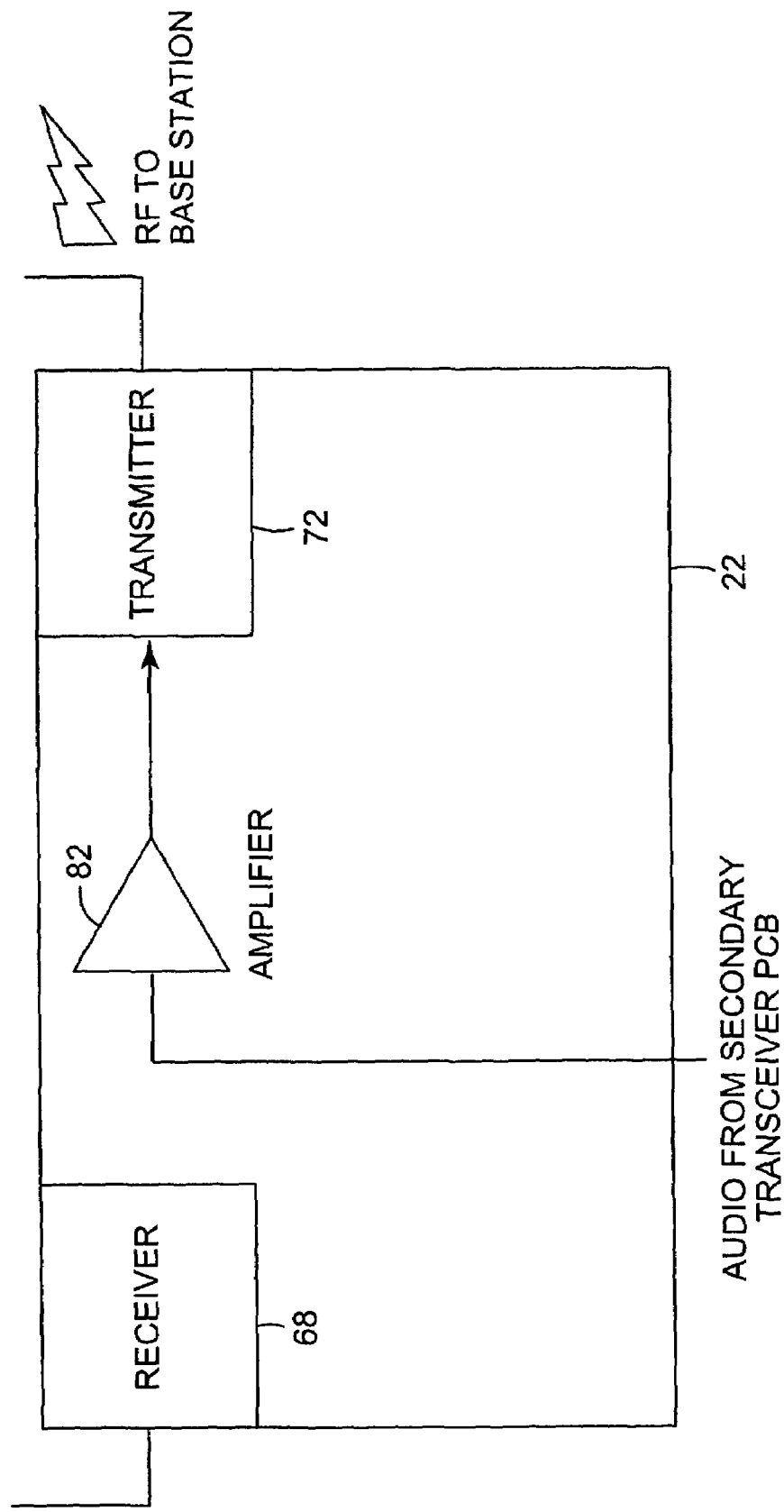
FIG. 13 is a diagrammatic illustration of the signal path in a belt pack in talk mode in an embodiment of an intercom system of the present invention.

FIG. 12 is a block diagram of secondary transceiver 60 of cradle 40 showing the signal path in talk mode in more detail. The wireless radio frequency signal at frequency F2 is obtained from ear set 44 by receiver 78, converted to audio and amplified in amplifier 80. In a preferred embodiment, the audio signal is then sent to two places. First, the audio signal is sent, via a modular telephone connector, to belt pack 22 (FIG. 13). Second, the audio is also sent to transmitter 76 of secondary transceiver 60 for transmission at a third frequency.

FIG. 13 is a block diagram of belt pack 22 showing the signal path in talk mode in more detail. The audio signal is received via a modular telephone connector, amplified in amplifier 82 and sent to transmitter 72 for radio frequency transmission at wireless frequency F1 to base station 18. Note that receiver 68 of belt pack 22 is not utilized in talk mode.

Figure 14:
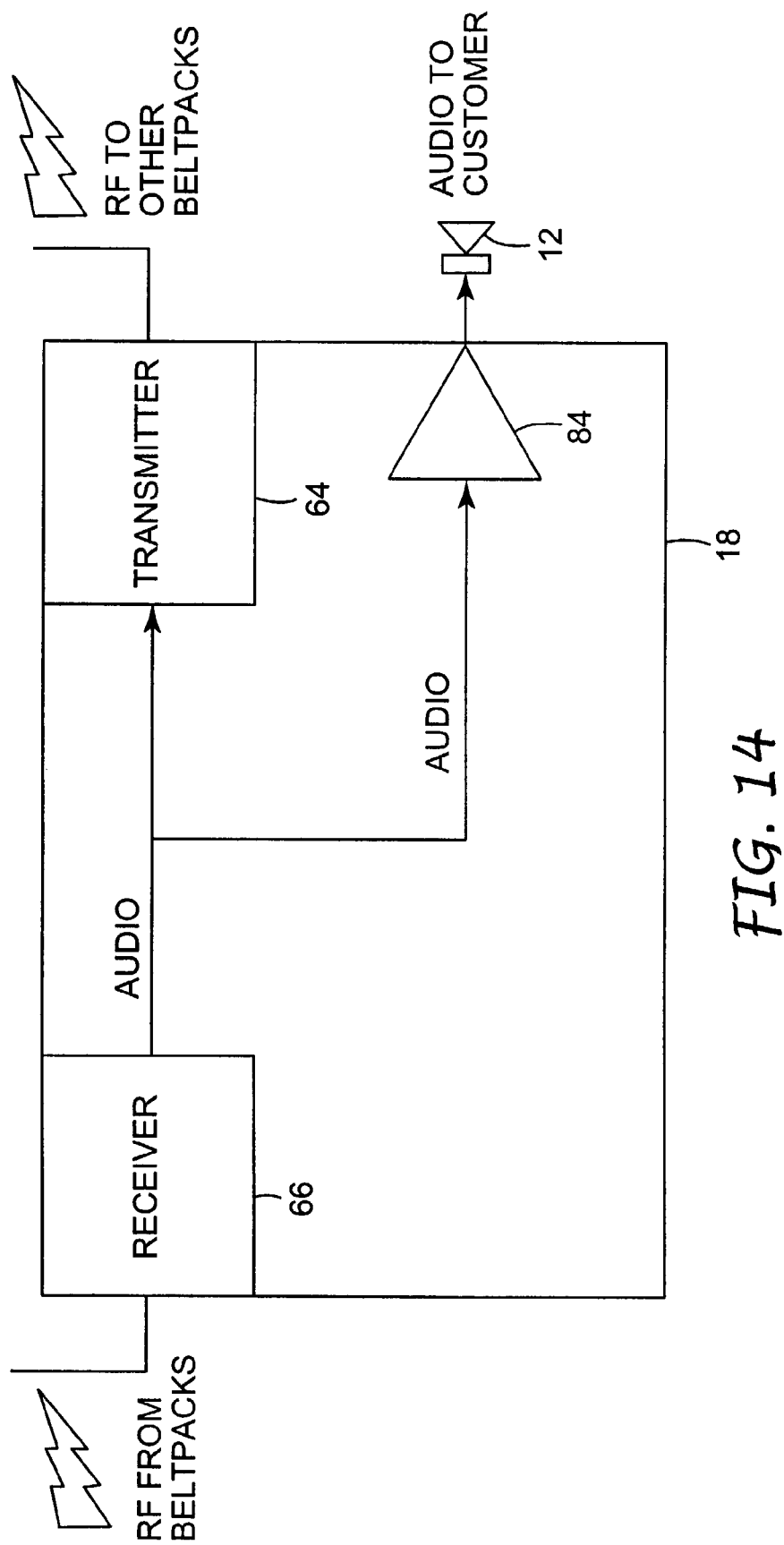
FIG. 14 is a diagrammatic illustration of the signal path in a base station in talk mode in an embodiment of an intercom system of the present invention.

FIG. 14 is a block diagram of base station 18 showing the signal path in talk mode in more detail. The radio frequency signal is obtained by receiver 66, converted to audio and, in a preferred embodiment, is sent to two places. First, the audio signal is amplified in amplifier 84 and sent, via cable 16 (FIG. 3) to remotely located speaker 12. Second, the audio signal is sent to transmitter 64 for conversion to radio frequency at frequency F1 for transmission to other belt packs 22 which may be utilized in a multiple belt pack 22 installation.

Figure 15:
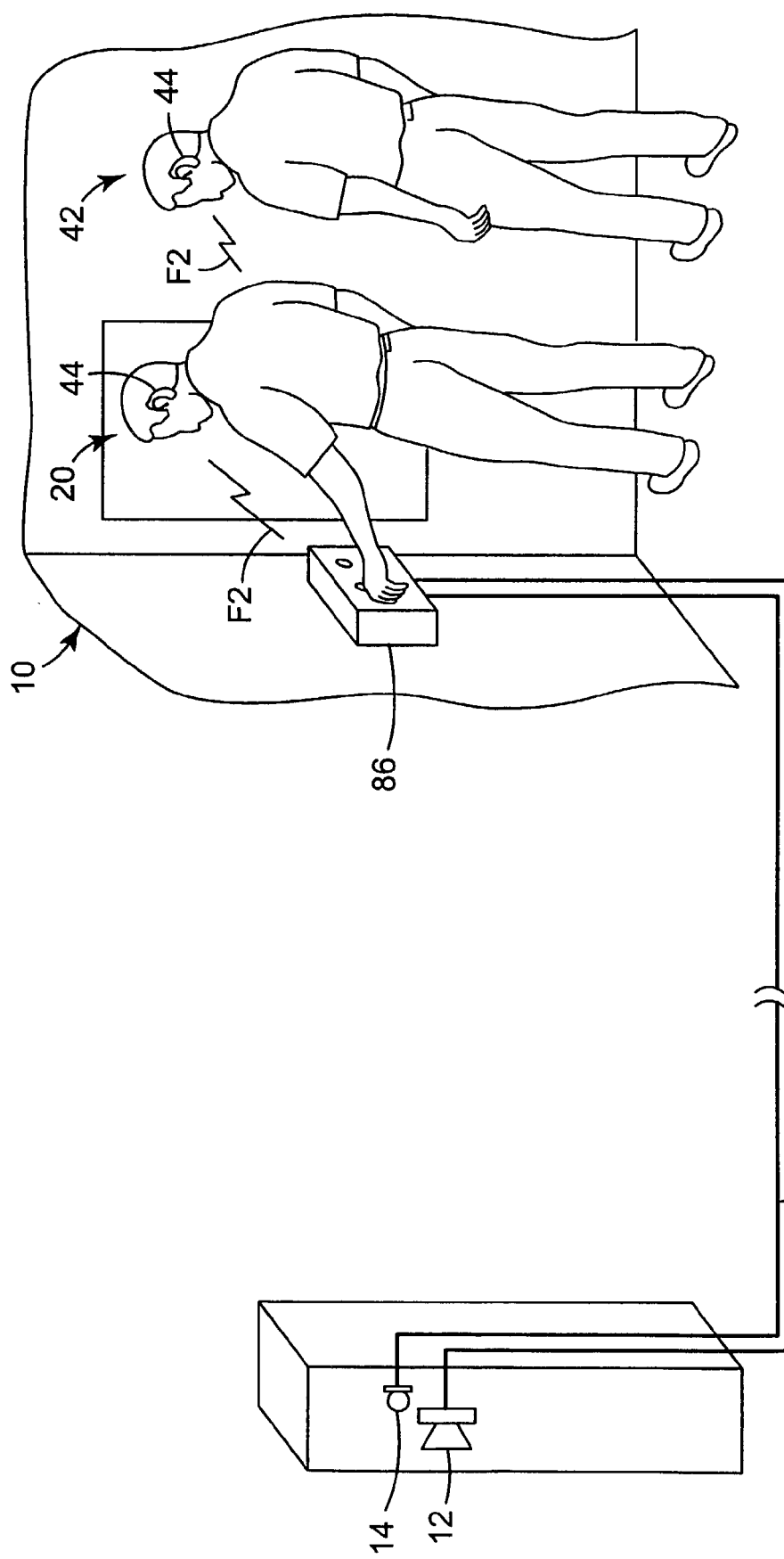
FIG. 15 illustrates an alternative embodiment of an intercom system of the present invention.

In an embodiment of the present invention, it is recognized that, particularly in new installations not already having existing belt packs 22, that the functionality of base station 18 and belt pack 22 could be combined into a single unit. In this situation, it would not be necessary to use a first wireless frequency F1 since the requirement for wireless communication between a separate base station 18 and a separate belt pack 22 would be eliminated. As shown in FIG. 15, combined base station 86 communicates with speaker 12 and microphone 14 as described above. However, instead of communicating with belt pack 22 on wireless frequency F1, combined base station 86 may communicate directly with ear sets 44 on wireless frequency F2. Many of the advantages of the present invention arising from the dichotomy in "listen mode range" and "talk mode range" are still obtained and one less component is required. The disadvantage, of course, is that retrofitting into existing installations is more difficult.

Alternatively, it is also recognized that the function of secondary transceiver 60 could be located inside belt pack 22 allowing belt pack 22 to wireless communicate on wireless frequency F2 with ear sets 44. The advantage would be in the elimination of a component. Again, the disadvantage is that retrofitting existing installations is more difficult.

The present invention provides a significant comfort advantage. The relatively small ear set 44 can be clipped onto the ear and typically weighs less than one ounce (28 grams). This size and weight are similar to wireless ear pieces commonly used with a mobile telephone in automobiles.

The present invention also provides a significant advantage in being unobtrusive. The relatively small ear set 44 can be hidden in the hair and generally not noticeable by observers making the invention useful to users who would not normally accept a standard prior art head set.

The present invention also provides a significant cost advantage. The relatively small ear set 44 is expected to cost less than one-half of the cost of a prior art belt pack 22. Since a single belt pack 22 can communicate with a plurality of ear sets 44, many more people in retail establishment 10 can wear ear sets 44 and have access to the communication link increasing efficiency of operation for retail establishment 10 and potentially lowering prices for customers.

The present invention also provides a significant advantage in being able to be easily retrofitted into existing installations currently utilizing conventional prior base station/belt pack/head set technology.

While the invention has been mostly described in terms of a retail establishment having a drive up lane, particularly a restaurant or a fast food type restaurant, it is recognized and understood the present invention may find utility in other intercom environments in which one or more people communicate with one or more people at a remote location. It is neither necessary nor required that the people or the equipment be located in a particular building, or any building, or be performing any particular function.

While the invention has been described mostly in terms of employees of a retail establishment, it is recognized and understood that the present invention is useful in other environments in which people communicating over the intercom would not necessarily be employees of the same organization, or any organization.

While the invention has been mostly described in terms of communication between a remotely located person presenting an order to an order taker located inside a restaurant, it is recognized and understood that the utility of the present invention is not limited to order takers and could be utilized by any person communicating with another individual at a remote location.

Various modifications and alterations of this invention will be apparent to those skilled in the art without departing from the scope and spirit of this invention. It should be understood that this invention is not limited to the illustrative embodiments set forth above.

What is claimed is:

1. An intercom system enabling a plurality of users to listen to and at least one user to speak to and listen to a remote user, comprising:
   a base station for communicating with said remote user; and
   a plurality of ear pieces wearable by said plurality of users, each of said plurality of ear pieces being capable of wirelessly communicating with said base station;
   at least one of said plurality of ear pieces being capable of speaking to said base station within a first range of said base station;
   each of said plurality of ear pieces being capable of wirelessly listening to said base station within a second range of said base station;
   said second range being larger than said first range;
   whereby one of said plurality of users wearing said at least one of said plurality of ear pieces may listen and talk with said remote user only within said first range of said base station and a remainder of said plurality of users wearing a remainder of said plurality of ear pieces may only listen to said remote user outside of said first range of said base station but inside of said second range of said base station.

2. An intercom system as in claim 1 wherein said second range is an order of magnitude greater than said first range.

3. An intercom system as in claim 1 wherein said second range is twenty-five times greater than said first range.

4. Art intercom system as in claim 1 wherein said first range is not more than two meters.

5. An intercom system as in claim 4 wherein said second range is on the order of fifty meters.

6. An intercom system as in claim 1 wherein said at least one of said plurality of ear pieces is switchable between listen only and listen and talk modes.

7. An intercom system as in claim 1 wherein said plurality of ear pieces is switchable between listen only and listen and talk modes.

8. An intercom system as in claim 1 further comprising a remotely located speaker and microphone operatively coupled to said base station for communicating with said remote user.

9. An intercom system enabling a first user to communicate with a second user, comprising:
   a base station for communicating with a remote user; and
   an ear piece wearable by said first user, said ear piece being capable of wirelessly communicating with said base station;
   said ear piece being capable of speaking to said base station within a first range of said base station;
   said ear piece being capable of wirelessly listening to said base station within a second range of said base station;
   said second range being larger than said first range;
   whereby said first user wearing said ear piece may listen and talk with said remote user only within said first range of said base station and may only listen to said remote user outside of said first range of said base station but inside of said second range of said base station.

10. An intercom system as in claim 9 wherein said second range is an order of magnitude greater than said first range.

11. An intercom system as in claim 9 wherein said second range is twenty-five times greater than said first range.

12. An intercom system as in claim 9 wherein said first range is not more than two meters.

13. An intercom system as in claim 12 wherein said second range is on the order of fifty meters.

14. An intercom system as in claim 9 wherein said ear piece is switchable between listen only and listen and talk modes.

15. An intercom system as in claim 9 bather comprising a remotely located speaker and microphone operatively coupled to said base station for communicating with said remote user.

16. An intercom system enabling a plurality of users to listen to and at least one user to speak to and listen to a remote user, comprising:
   a base station for communicating with said remote user;
   a portable communication device for wirelessly communicating with said base station on a first frequency; and
   a cradle adapted to host said portable communication device and being operatively coupled to said portable communication device when hosting said portable communication device;
   a plurality of ear pieces wearable by said plurality of user, each of said plurality of ear pieces being capable of wirelessly communicating with said portable communication device through said cradle on a second frequency;
   at least one of said plurality of ear pieces being capable of speaking to said portable communication device through said cradle within a first range of said portable communication device;
   said plurality of ear pieces being capable of wirelessly listening to said portable communication device through said cradle within a second range of said portable communication device;
   said second range being larger than said first range;
   whereby one of said plurality of users wearing said at least one of said plurality of ear pieces may listen and talk with said remote user only within said first range of said base station and a remainder of said plurality of users wearing a remainder of said plurality of ear pieces may only listen to said remote user outside of said first range of said base station but inside of said second range of said base station.

17. An intercom system as in claim 16 wherein said second range is an order of magnitude greater than said first range.

18. An intercom system as in claim 16 wherein said second range is twenty-five times greater than said first range.

19. An intercom system as in claim 16 wherein said first range is not more than two meters.

20. An intercom system as in claim 19 wherein said second range is on the order of fifty meters.

21. An intercom system as in claim 16 wherein said at least one of said plurality of ear pieces is switchable between listen only and listen and talk modes.

22. An intercom system as in claim 16 wherein said plurality of ear pieces is switchable between listen only and listen and talk modes.

23. An intercom system as in claim 16 wherein said portable communication device is a belt pack wearable by one of said plurality of users.

24. An intercom system enabling a first user to communicate with a remote user, comprising:
a base station for communicating with said remote user;
a portable communication device for wirelessly communicating with said base station on a first frequency; and
a cradle adapted to host said portable communication device and being operatively coupled to said portable communication device when hosting said portable communication device;
an ear piece wearable by said first user, said ear piece being capable of wirelessly communicating with said portable communication device through said cradle on a second frequency;
said ear piece being capable of speaking to said portable communication device through said cradle within a first range of said portable communication device;
said ear piece being capable of wirelessly listening to said portable communication device through said cradle within a second range of said portable communication device;
said second range being larger than said first range;
whereby said first user wearing said ear piece may listen and talk with said remote user only within said first range of said base station and may only listen to said remote user outside of said first range of said base station but inside of said second range of said base station.

25. An intercom system as in claim 24 wherein said second range is an order of magnitude greater than said first range.

26. An intercom system as in claim 24 wherein said second range is twenty-five times greater than said first range.

27. An intercom system as in claim 24 wherein said first range is not more than two meters.

28. An intercom system as in claim 27 wherein said second range is on the order of fifty meters.

29. An intercom system as in claim 24 wherein said ear piece is switchable between listen only and listen and talk modes.

30. An intercom system as in claim 24 further comprising a remotely located speaker and microphone operatively coupled to said base station for communicating wit said remote user.

31. An intercom system as in claim 24 wherein said portable communication device is a belt pack wearable by one of said plurality of users.

32. In an intercom system enabling a first user to communicate with a remote user, having a base station for communicating with said remote user and a belt pack for wirelessly communicating with said base station on a first frequency,
a cradle adapted to host said belt pack and being operatively coupled to said belt pack when hosting said belt pack;
an ear piece wearable by said first user, said ear piece being capable of wirelessly communicating with said belt pack through said cradle on a second frequency;
said ear piece being capable of speaking to said belt pack through said cradle within a first range of said belt pack;
said ear piece being capable of wirelessly listening to said belt pack through said cradle within a second range of said belt pack;
said second range being larger than said first range;
whereby said first user wearing said ear piece may listen and talk with said remote user only within said first range of said base station and may only listen to said remote user outside of said first range of said base station but inside of said second range of said base station.

33. An intercom system as in claim 32 wherein said second range is an order of magnitude greater than said first range.

34. An intercom system as in claim 32 wherein said second range is twenty-five times greater than said first range.

35. An intercom system as in claim 32 wherein said first range is not more than two meters.

36. An intercom system as in claim 35 wherein said second range is on the order of fifty meters.

37. An intercom system as in claim 32 wherein said ear piece is switchable between listen only and listen and talk modes.

38. An intercom system as in claim 32 further comprising a remotely located speaker and microphone operatively coupled to said base station for communicating with said remote user.

39. In an intercom system enabling a first user to communicate with a remote user, having a base station for communicating with said remote user and a plurality of belt packs for wirelessly communicating with said base station on a first frequency,
a cradle adapted to host one of said plurality of belt packs and being operatively coupled to said one of said plurality of belt packs when hosting said one of said plurality of belt packs;
an ear piece wearable by said first user, said ear piece being capable of wirelessly communicating with said one of said plurality of belt packs through said cradle on a second frequency;
said ear piece being capable of speaking to said one of said plurality of belt packs through said cradle within a first range of said one of said plurality of belt packs;
said ear piece being capable of wirelessly listening to said one of said plurality of belt packs through said cradle within a second range of said one of said plurality of belt packs;
said second range being larger than said first range;
whereby said first user wearing said ear piece may listen and talk with said remote user only within said first range of said base station and may only listen to said remote user outside of said first range of said base station but inside of said second range of said base station.

40. A method of communicating using an intercom system enabling a plurality of users to listen to and at least one user to speak to and listen to a remote user, a base station for communicating with said remote user; and a plurality of ear pieces wearable by said plurality of users, each of said plurality of ear pieces being capable of wirelessly communicating with said base station, at least one of said plurality of ear pieces being capable of wirelessly speaking to said base station within a first range of said base station, each of said plurality of ear pieces being capable of listening to said base station within a second range of said base station, and said second range being larger than said first range, comprising the steps of:

allowing said plurality of users who are within said second range of said base station but who are not within said first range of said base station to listen to said remote user through said base station; and said at least one user moving to within said first range of said base station and both listening to and talking to said remote user.

41. A method of communicating as in claim 40 wherein said second range is an order of magnitude greater than said first range.

42. A method of communicating as in claim 40 wherein said first range is not more than two meters.

43. A method of communicating using an intercom enabling a first user to communicate with a remote user, a base station for communicating with said remote user, a belt pack for wirelessly communicating with said base station on a first frequency; a cradle adapted to host said belt pack and being operatively coupled to said belt pack when hosting said belt pack; and an ear piece wearable by said first user, said ear piece being capable of wirelessly communicating with said belt pack through said cradle on a second frequency, said ear piece being capable of speaking to said belt pack through said cradle within a first range of said belt pack, said ear piece being capable of wirelessly listening to said belt pack trough said cradle within a second range of said belt pack, said second range being larger than said first range, comprising the steps of:

hosting said belt pack in said cradle;

allowing said plurality of users who are within said second range of said base station but who are not within said first range of said base station to listen to said remote user through said base station; and said at least one user moving to within said first range of said base station and both listening to and talking to said remote user.

44. An intercom system as in claim 43 wherein said second range is an order of magnitude greater than said first range.

45. An intercom system as in claim 43 wherein said first range is not more than two meters.

* * * * *

UNITED STATES PATENT AND TRADEMARK OFFICE
CERTIFICATE OF CORRECTION

| | | |
|---|---|---|
| PATENT NO. | : 7,120,388 B2 | Page 1 of 1 |
| APPLICATION NO. | : 10/319955 | |
| DATED | : October 10, 2006 | |
| INVENTOR(S) | : Ronald W. Hall | |

It is certified that error appears in the above-identified patent and that said Letters Patent is hereby corrected as shown below:

Title Page, Col. 2 (Other Publications) - Delete "Ststem" and insert -- System --, therefor*

Page 3, Col. 1 (Other Publications) - Delete "C860/C960SL/C1025" and insert -- C860/C960/C960SL/C1025 --, therefor Page 2, Col. 2 (Foreign Patent Documents) - After "10/2001" insert -- H04R 1/10 --.

Column 11
Line 57 (Approximately) - In Claim 4, delete "Art" and insert -- An --, therefor Column 12
Line 7 - In Claim 9, after "with" delete "a" and insert -- said --, therefor.
Line 34 - In Claim 15, delete "bather" and insert -- further --, therefor Column 13
Line 66 - In Claim 30, delete "wit" and insert -- with --, therefor.

Column 16
Line 12 - In Claim 43, delete "trough" and insert -- through --, therefor Signed and Sealed this Tenth Day of April, 2007

JON W. DUDAS
*Director of the United States Patent and Trademark Office*